US010282816B2

United States Patent
Tomono

(10) Patent No.: US 10,282,816 B2
(45) Date of Patent: May 7, 2019

(54) NON-TRANSITORY STORAGE MEDIUM STORING INSTRUCTIONS, MOBILE TERMINAL, AND IMAGE PROCESSING APPARATUS

(71) Applicant: Brother Kogyo Kabushiki Kaisha, Nagoya (JP)

(72) Inventor: Keitaro Tomono, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 14/518,155

(22) Filed: Oct. 20, 2014

(65) Prior Publication Data
US 2015/0109344 A1 Apr. 23, 2015

(30) Foreign Application Priority Data
Oct. 21, 2013 (JP) ................................. 2013-218683

(51) Int. Cl.
G09G 5/00 (2006.01)
G06T 3/40 (2006.01)
(Continued)

(52) U.S. Cl.
CPC .................. *G06T 3/40* (2013.01); *G06T 1/20* (2013.01); *G09G 5/14* (2013.01); *G06F 3/1454* (2013.01);
(Continued)

(58) Field of Classification Search
CPC ......... G06F 3/0481; G09G 5/373; G06T 1/20; G06T 3/40
(Continued)

(56) References Cited

U.S. PATENT DOCUMENTS 6,292,271 B1* 9/2001 Phan .................. H04N 1/00384
358/1.15
2002/0171762 A1* 11/2002 Maxson .............. H04L 12/2805
348/552
(Continued)

FOREIGN PATENT DOCUMENTS

JP 2009-094591 A1 4/2009
JP 2013-186671 A1 9/2013

OTHER PUBLICATIONS

Brother J625DW—A Wireless Multi-functional Printer, Jan. 10, 2012 (http://www.thegeeksclub.com/brother-j625dw-a-wireless-multi-functional-printer/), pp. 1-5.*
(Continued)

*Primary Examiner* — Sarah Lhymn
(74) *Attorney, Agent, or Firm* — Burr & Brown, PLLC

(57) ABSTRACT

A non-transitory storage medium stores instructions executable by a mobile terminal. The instructions cause the mobile terminal to: change a first image to a first size and change a second image to a maximum size in which the second image is displayable on a display area which remains after the first image of the first size is arranged, when priority mode information indicates a first-image priority mode; and change the first image to a second size less than the first size and change the second image to a maximum size in which the second image is displayable on a display area which remains after the first image of the second size is arranged, when the priority mode information indicates a second-image priority mode.

9 Claims, 13 Drawing Sheets

(51) Int. Cl.
*G06T 1/20* (2006.01)
*G09G 5/14* (2006.01)
*G06F 3/14* (2006.01)

(52) U.S. Cl.
CPC ............... *G09G 2340/0407* (2013.01); *G09G 2340/0464* (2013.01); *G09G 2340/145* (2013.01)

(58) Field of Classification Search
USPC ....... 345/619, 660, 661, 662, 665, 667, 668, 345/669, 670, 671, 672, 676
See application file for complete search history.

(56) References Cited

U.S. PATENT DOCUMENTS

| | | | | |
|---|---|---|---|---|
| 2005/0208983 | A1* | 9/2005 | Khoo | G06F 3/0231 455/575.1 |
| 2006/0262136 | A1* | 11/2006 | Vaisanen | G06F 3/0485 345/619 |
| 2007/0250794 | A1* | 10/2007 | Miura | G06F 3/0482 715/810 |
| 2008/0094421 | A1* | 4/2008 | Maeda | G06F 3/0481 345/661 |
| 2008/0270516 | A1* | 10/2008 | Ragnet | G06F 17/30011 709/202 |
| 2011/0093822 | A1* | 4/2011 | Sherwani | H04L 67/38 715/863 |
| 2011/0154227 | A1* | 6/2011 | Kang | G06F 3/1204 715/760 |
| 2012/0013799 | A1* | 1/2012 | Murayama | H04N 5/44513 348/468 |
| 2012/0192117 | A1* | 7/2012 | Migos | G06F 17/241 715/863 |
| 2013/0238984 | A1 | 9/2013 | Okazato | |

OTHER PUBLICATIONS

Japanese Office Action (Application No. 2013-218683) dated Feb. 7, 2017 (with English translation).

* cited by examiner

NON-TRANSITORY STORAGE MEDIUM STORING INSTRUCTIONS, MOBILE TERMINAL, AND IMAGE PROCESSING APPARATUS

CROSS REFERENCE TO RELATED APPLICATION

The present application claims priority from Japanese Patent Application No. 2013-218683, which was filed on Oct. 21, 2013, the disclosure of which is herein incorporated by reference in its entirety.

BACKGROUND

Technical Field

The present invention relates to a mobile terminal capable of remotely controlling an image processing apparatus, the image processing apparatus, a non-transitory storage medium storing a plurality of instructions executable by a processor of the mobile terminal, and a non-transitory storage medium storing a plurality of instructions executable by a processor of the image processing apparatus.

Description of the Related Art

There is conventionally known an image processing apparatus including: a plurality of buttons including a numeric keypad; and a display panel which allows a user to perform a touch operation on an image displayed on the display panel. This image processing apparatus receives from the user instructions provided by combination of pressing of the button and a touch operation on the display panel. This configuration enables the user to input various complicated instructions into the image processing apparatus.

In order to operate the image processing apparatus having the configuration, however, the user has to go to a location where the image processing apparatus is installed. To solve this problem, there is known a technique in which operation switch images are displayed on a display panel of an electronic device in a layout that is substantially the same as a layout of operation switches provided on an imaging device, and the imaging device can be operated from the electronic device.

SUMMARY

However, a layout of a plurality of buttons and a display panel varies from one image processing apparatus to another, making it difficult for an image having this layout to be displayed on a display device of a mobile terminal without any changes. On the other hand, operability may be lowered by great change in layout or excessive size reduction of one or both of an image indicating a multiplicity of buttons mounted on the image processing apparatus and an image displayed on the display panel.

This invention has been developed to provide a mobile terminal, an image processing apparatus, a non-transitory storage medium storing a plurality of instructions executable by a processor of the mobile terminal, and a non-transitory storage medium storing a plurality of instructions executable by a processor of the image processing apparatus, each allowing remote control of the image processing apparatus with improved operability.

The present invention provides a non-transitory storage medium storing a plurality of instructions executable by a processor of a mobile terminal. The mobile terminal includes a display, an operating unit, a storage device, and a communicating device configured to communicate with an image processing apparatus. The display is capable of concurrently displaying a first image and a second image as a plurality of images. The storage device configured to store (i) priority mode information indicating one of a first-image priority mode and a second-image priority mode and (ii) first image data representative of the first image in which a plurality of objects respectively indicating a plurality of buttons mounted or displayed on the image processing apparatus are arranged. When executed by the processor, the plurality of instructions cause the processor to: receive, through the communicating device from the image processing apparatus, second image data representative of a second image of a rectangular shape to be displayed on a display screen of the image processing apparatus; execute a size changing processing in which the processor changes sizes of the first image and the second image based on the priority mode information stored in the storage device and a size of a display region of the display; and transmit, through the communicating device to the image processing apparatus, location information to the image processing apparatus when the operating unit has received a tap operation performed on a first location on the size-changed second image being displayed on the display, the location information specifying second location that corresponds to the first location and that is located on the second image of a size established before changing the size of the second image. The size changing processing includes: changing the size of the first image to a first size and changing the size of the second image to a maximum size in which the second image is displayable on a display area on the display which remains after the first image of the first size is arranged, when the priority mode information indicates the first-image priority mode; changing the size of the first image to a second size less than the first size and changing the size of the second image to a maximum size in which the second image is displayable on a display area on the display which remains after the first image of the second size is arranged, when the priority mode information indicates the second-image priority mode; and displaying on the display the first image and the second image whose sizes have been changed.

The present invention also provides a mobile terminal including a display, an operating unit, a storage device, a communicating device configured to communicate with an image processing apparatus, and a controller. The display is capable of concurrently displaying a first image and a second image as a plurality of images. The storage device is configured to store (i) priority mode information indicating one of a first-image priority mode and a second-image priority mode and (ii) first image data representative of the first image in which a plurality of objects respectively indicating a plurality of buttons mounted or displayed on the image processing apparatus are arranged. The controller is configured to: receive, through the communicating device from the image processing apparatus, second image data representative of a second image of a rectangular shape to be displayed on a display screen of the image processing apparatus; execute a size changing processing in which the processor changes sizes of the first image and the second image based on the priority mode information stored in the storage device and a size of a display region of the display; and transmit through the communicating device location information to the image processing apparatus when the operating unit has received a tap operation performed on a first location on the size-changed second image being displayed on the display, the location information specifying second location that corresponds to the first location and that is located on the second image of a size established before the change of the size of the second image. The controller is configured to in the size changing processing: change the size of the first image to a first size and change the size of the second image to a maximum size in which the second image is displayable on a display area on the display which remains after the first image of the first size is arranged, when the priority mode information indicates the first-image priority mode; change the size of the first image to a second size less than the first size and change the size of the second image to a maximum size in which the second image is displayable on a display area on the display which remains after the first image of the second size is arranged, when the priority mode information indicates the second-image priority mode; and display on the display the first image and the second image whose sizes have been changed.

The present invention also provides an image processing apparatus, including: an image processing device configured to execute a processing for image data; a display; a communicating device configured to communicate with a mobile terminal; a storage device configured to store transition-source image data representative of an transition-source image containing at least one object and transition-target image data representative of a transition-target image associated with the at least one object contained in the transition-source image, as image data representative of an image to be displayed on the display to receive an instruction for operating the image processing device; and a controller configured to: execute a first transmitting processing in which the communicating device is controlled to transmit the transition-source image data to the mobile terminal; execute a receiving processing in which the communicating device is controlled to receive, from the mobile terminal, location information specifying a location on the transition-source image; specify one object of the at least one object which is arranged at the location of the transition-source image which is specified by the received location information; and execute a second transmitting processing in which the communicating device is controlled to transmit, to the mobile terminal, the transition-target image data stored in the storage device in association with the one object, when the one object is specified.

The present invention also provides a non-transitory storage medium storing a plurality of instructions executable by a processor of an image processing apparatus. The image processing apparatus includes: an image processing device configured to execute a processing for image data; a display; a communicating device configured to communicate with a mobile terminal; and a storage device configured to store transition-source image data representative of an transition-source image containing at least one object and transition-target image data representative of a transition-target image associated with the at least one object contained in the transition-source image, as image data representative of an image to be displayed on the display to receive an instruction for operating the image processing device. When executed by the processor, the plurality of instructions cause the processor to: execute a first transmitting processing in which the communicating device is controlled to transmit the transition-source image data to the mobile terminal; execute a receiving processing in which the communicating device is controlled to receive, from the mobile terminal, location information specifying a location on the transition-source image; specify one object of the at least one object which is arranged at the location of the transition-source image which is specified by the received location information; and execute a second transmitting processing in which the communicating device is controlled to transmit, to the mobile terminal, the transition-target image data stored in the storage device in association with the one object, when the one object is specified.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIGS. 5A and 5B are views each illustrating an example of a display of a display of the mobile terminal, wherein FIG. 5A is a view illustrating an example of a display of a standard first image of a first size, and FIG. 5B is a view illustrating an example of a display of the standard first image of a second size;

FIGS. 6A and 6B are views each illustrating an example of a display of the display of the mobile terminal, wherein FIG. 6A is a view illustrating an example of a display of a deformed first image of a first size, and FIG. 6B is a view illustrating an example of a display of a deformed first image of a second size;

FIGS. 10A and 10B are views each illustrating an example of a display of the display of the mobile terminal, wherein FIG. 10A is a view illustrating an example of a display in which an upper side of a housing faces upward vertically, and FIG. 10B is a view illustrating an example of a display in a case where a second image indicating that an printing operation is being performed is received;

FIGS. 12A through 12C are views for explaining a change of the second image due to a flick operation, wherein FIG. 12A illustrates a state established before the change, FIG. 12B illustrates a state established during the change, and FIG. 12C illustrates a state established after the change.

DETAILED DESCRIPTION OF THE EMBODIMENT

Hereinafter, there will be described one embodiment of the present invention by reference to the drawings. It is to be understood that the following embodiments are described only by way of example, and the invention may be otherwise embodied with various modifications without departing from the scope and spirit of the invention.

Figure 1:
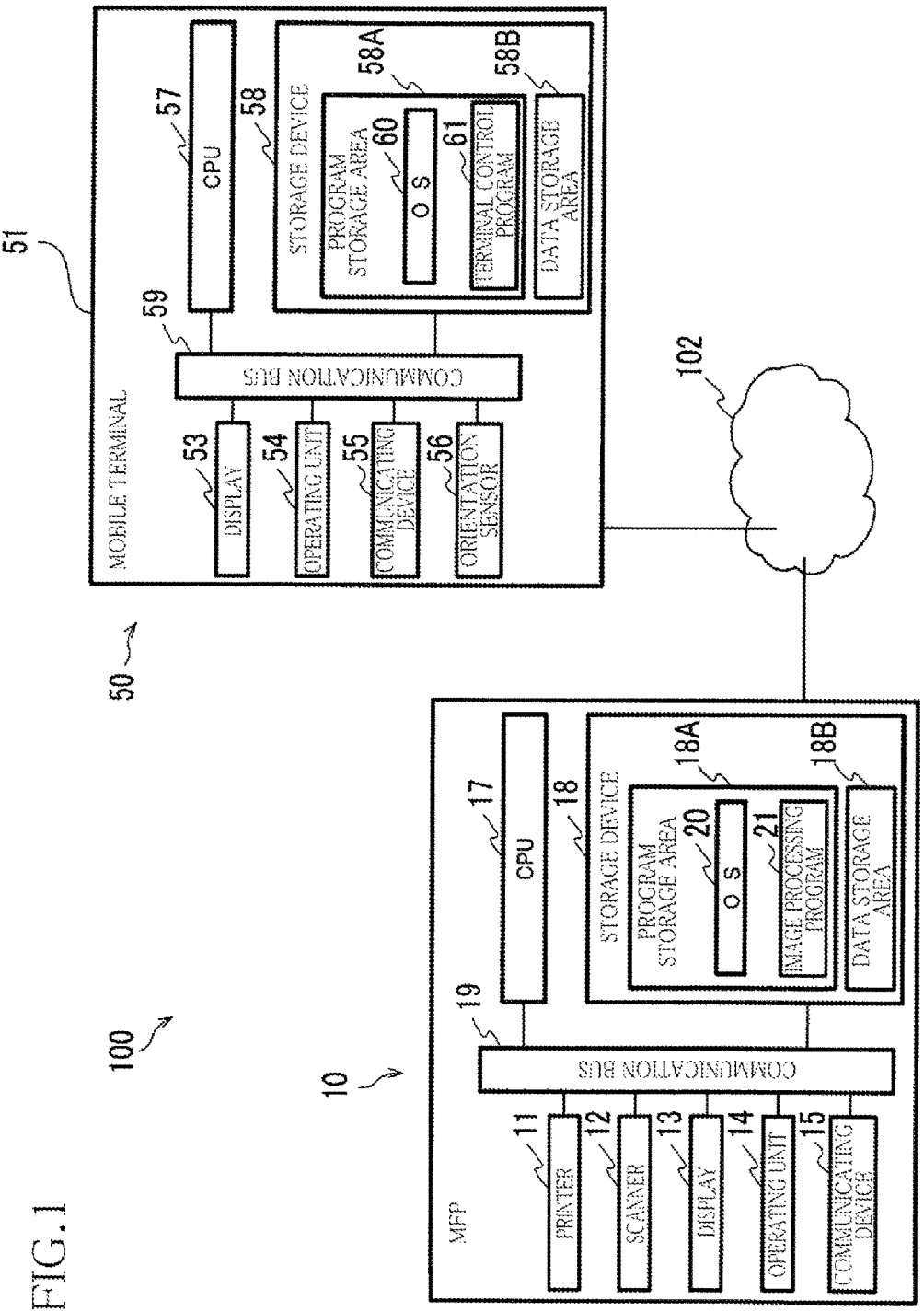
FIG. 1 is a schematic view illustrating an image processing system according to one embodiment of the present invention.

FIG. 1 illustrates an image processing system 100 according to one embodiment of the present invention. The image processing system 100 is constituted by a multi-function peripheral (MFP) 10 and a mobile terminal 50. The MFP 10 and the mobile terminal 50 are communicable with each other over a communication network 102. The communication standard between the MFP 10 and the mobile terminal 50 is not limited in particular and may be a wired LAN (Local Area Network), a wireless LAN, or an NFC (Near Field Communication), for example.

MFP 10

Figure 2B:
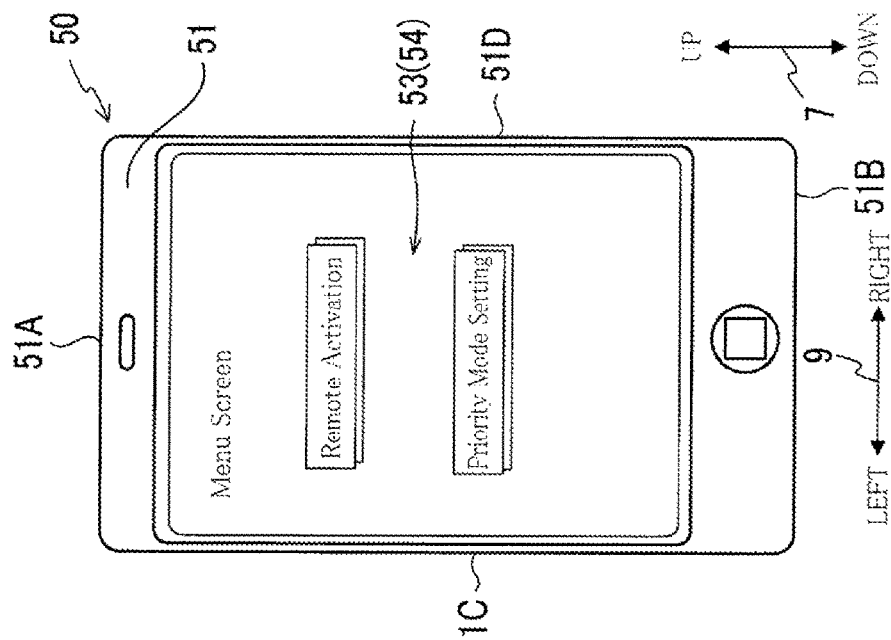
FIG. 2B is a front elevational view of the mobile terminal 50.
Figure 2A:
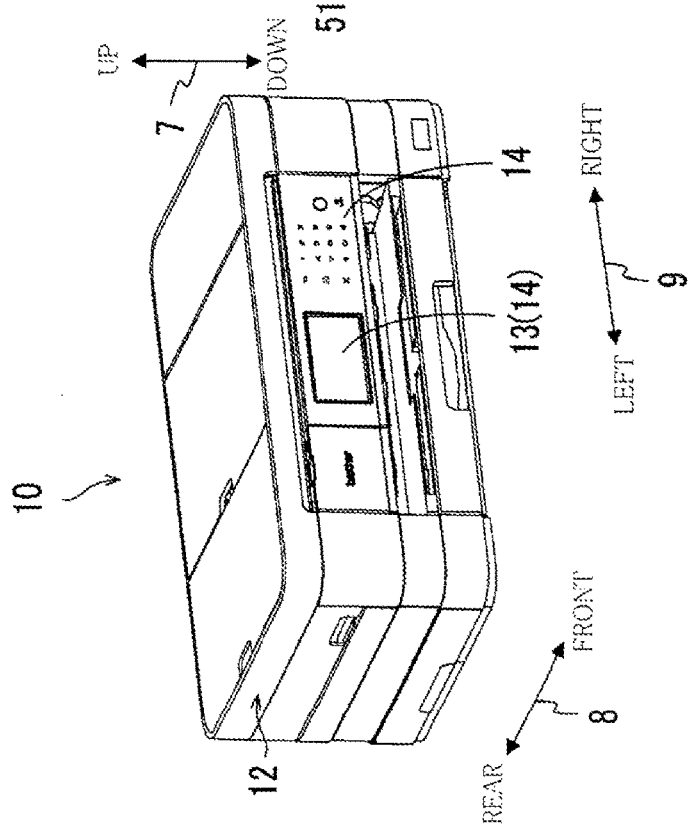
FIG. 2A is an external perspective view of a multi-function peripheral (MFP)

As illustrated in FIGS. 1 and 2A, the MFP 10 includes a printer 11, a scanner 12, a display 13, an operating unit 14, a communicating device 15, a central processing unit (CPU) 17, a storage device 18, and a communication bus 19. The devices and components of the MFP 10 are connected to each other by the communication bus 19. The MFP 10 is one example of an image processing apparatus.

The printer 11 performs a printing operation in which the printer 11 uses a well-known method such as an ink jet method and an electronic photographic method to record an image on a recording medium based on image data. The scanner 12 performs a scanning operation for creating image data by reading an image recorded on a document. Each of the printer 11 and the scanner 12 is an image processing device which executes a processing for image data. The MFP 10 may further perform (i) a copying operation in which the printer 11 records an image on the recording medium based on the image data created by the scanner 12 and (ii) a facsimile operation for transmitting and receiving a facsimile, for example.

Display 13

The display 13 includes a display screen for displaying various kinds of information thereon. The display 13 may be constituted by any device such as a liquid crystal display (LCD) and an organic electroluminescent display (organic ELD).

Operating Unit 14

The operating unit 14 is an input interface capable of sensing operations of a user. As illustrated in FIG. 2A, the operating unit 14 includes a plurality of push-buttons. The operating unit 14 sends the CPU 17 button identifying information which identifies a pushed or pressed one or ones of the push-buttons. It is noted that these push-buttons are not limited to mechanical buttons and may be buttons using an electrostatic sensor or a pressure sensor, for example. In the present embodiment, buttons arranged on a rectangular region of a front face of the MFP 10 include numeric buttons "0"-"9", a "*" button, a "#" button, a Return button shaped like an arrow, a Home button shaped like a home, and a "x" button.

The operating unit 14 further includes a touch sensor shaped like a thin layer superposed on the display screen of the display 13. That is, the display 13 is constituted by a touch panel display. The operating unit 14 senses an operation of the user on an object displayed on the display screen of the display 13. The touch sensor may be constituted by a well-known sensor such as a capacitance sensor and a resistive film sensor. It is noted that the object is an image selectable by the user operating the operating unit 14. More specifically, the object is an icon, a button, a link, or the like displayed on the display 13. The object may be selected by a tap operation performed on a location at which the object is displayed.

Communicating Device 15

The communicating device 15 is an interface for communicating with an external device over a communication network or a communication line. That is, the MFP 10 controls the communicating device 15 to transmit various kinds of data and various kinds of information to the mobile terminal 50 and controls the communicating device 15 to receive or receive various kinds of information from the mobile terminal 50.

CPU 17

The CPU 17 controls operations of the MFP 10. The CPU 17 receives various programs which will be described below from the storage device 18 and executes the programs based on information transmitted from the operating unit 14 and information received from the mobile terminal 50 via the communicating device 15. That is, the CPU 17 and the storage device 18 are one example of a controller.

Storage Device 18

The storage device 18 includes a program storage area 18A and a data storage area 18B. The program storage area 18A stores an operating system (OS) 20 and an image processing program 21. It is noted that the image processing program 21 may be a single program and may be a collection of a plurality of programs. The data storage area 18B stores data and/or information required for execution of the image processing program 21. For example, the data storage area 18B stores transition-source image data representative of an transition-source image, transition-target image data representative of a transition-target image, and selection effectiveness information indicating whether a press of one or ones of the push-buttons is effective or not. These data will be described later in detail.

In the present specification, the term "data" and the term "information" are the same in that each of them is a bit or a bit string which can be handled by a computer. The data can be handled by the computer regardless of details indicated by each bit. The information causes branching in an operation of the computer depending on details indicated by each bit. Moreover, the term "instruction" is a control signal for demanding next operation to a device to which the instruction is transmitted, and may include the information or may have a nature of the information.

Also, even if the data and the information are changed in format (e.g., a text format, a binary format, and a flag format) for each computer, the computer treats the data before the change and the data after the change as the same data as long as the computer recognizes that the data before the change and the data after the change are substantially the same as each other. For example, information indicating "two" may be stored in one computer as information in a text format of "0x32" in the ASCII code and stored in another computer as information in a binary format of "10" as a binary number.

However, the data and the information are not strictly distinguished and may be treated exceptionally. For example, the data may be temporarily treated as the information, and the information may be temporarily treated as the data. Also, the data treated in one apparatus may be treated as the information in another apparatus, and vice versa. Furthermore, the information may be taken out from the data, and the data from the information.

The storage device 18 is, for example, constituted by a RAM (Random Access Memory), a ROM (Read Only Memory), an EEPROM (Electrically Erasable Programmable Read-Only Memory), an HDD (Hard Disk Drive), a buffer for the CPU 17, and other similar devices, or constituted by a combination of at least two of the above-mentioned devices. The storage device 18 may be a storage medium readable by a computer. The storage medium readable by a computer is a non-transitory medium. Examples of the non-transitory medium include, in addition to the above-mentioned example, storage media such as a CD-ROM and a DVD-ROM. However, electrical signals for transmitting programs downloaded from, e.g., a server on the Internet are not the non-transitory medium.

Programs stored in the program storage area 18A are executed by the CPU 17. However, in the present specification, an operation of each of the programs may be described without referring to the CPU 17. That is, the description meaning that "a program A executes processing A" may indicate that "the CPU 17 executes the processing A written in the program A". This applies to the mobile terminal 50 described later.

The OS 20 is a basic program which provides an API (Application Programming Interface) for controlling hardware constituting the MFP 10 such as the printer 11, the scanner 12, the display 13, the operating unit 14, and the communicating device 15. That is, each of the above-mentioned programs controls the hardware by calling up the API provided by the OS 20. However, in the present specification, operations of the programs will be described without referring to the OS 20. That is, the description described later meaning that "program B controls hardware C" may indicate that "the program B controls the hardware C through the API of the OS 20". This applies to the mobile terminal 50 described later.

Mobile Terminal 50

As illustrated in FIGS. 1 and 2B, the mobile terminal 50 includes a housing 51, a display 53, an operating unit 54, a communicating device 55, an orientation sensor 56, a CPU 57, a storage device 58, and a communication bus 59. The display 53, the operating unit 54, the communicating device 55, the CPU 57, the storage device 58, and the communication bus 59 of the mobile terminal 50 are similar in function to the display 13, the operating unit 14, the communicating device 15, the CPU 17, the storage device 18, and the communication bus 19 of the MFP 10, and an explanation thereof is omitted. However, a program storage area 58A of the storage device 58 stores an OS 60 and a terminal control program 61. Also, a data storage area 58B stores priority mode information which will be described below.

Housing 51

The housing 51 shown in FIG. 2B has a flat box which is shorter in length in a front and rear direction (i.e., into the page as shown in FIG. 2B) than in an up and down direction 7 and in a right and left direction 9 of FIG. 2B. More specifically, as illustrated in FIG. 2B, in a plan view seen from a front side, the housing 51 has a rectangular shape constituted by an upper side 51A and a lower side 51B extending in generally parallel with the right and left direction 9 and by a left side 51C and a right side 51D extending in generally parallel with the up and down direction 7. Each of the components of the mobile terminal 50 illustrated in FIG. 1 are disposed on a surface of the housing 51 or inside the housing 51. For example, the display 53 is disposed on a front face of the housing 51. The mobile terminal 50 has a size enabling the user to carry it with one or both hands, and the mobile terminal 50 typically is a mobile phone or a tablet computer.

Orientation Sensor 56

The orientation sensor 56 senses an orientation of the housing 51 and sends the CPU 57 orientation information indicating the sensed orientation. More specifically, as illustrated in FIG. 2B, the orientation sensor 56 senses an inclination or an angle of the housing 51 on a virtual plane including a display screen of the display 53 with reference to an orientation of the housing 51 in which the upper side 51A faces upward in the vertical direction (the upper side 51A is positioned above the lower side 51B in the vertical direction). The orientation information is not limited in particular. For example, the orientation information is defined such that a rotation angle of the housing 51 being in an orientation of the housing 51 whose upper side 51A faces upward in the vertical direction is determined to be 0° and such that a rotation angle of the housing 51 in a clockwise direction is expressed by 0° through 360°. The orientation sensor 56 may be any kind of sensor such as a gyro sensor, for example.

Operations of Image Processing System

Figure 3:
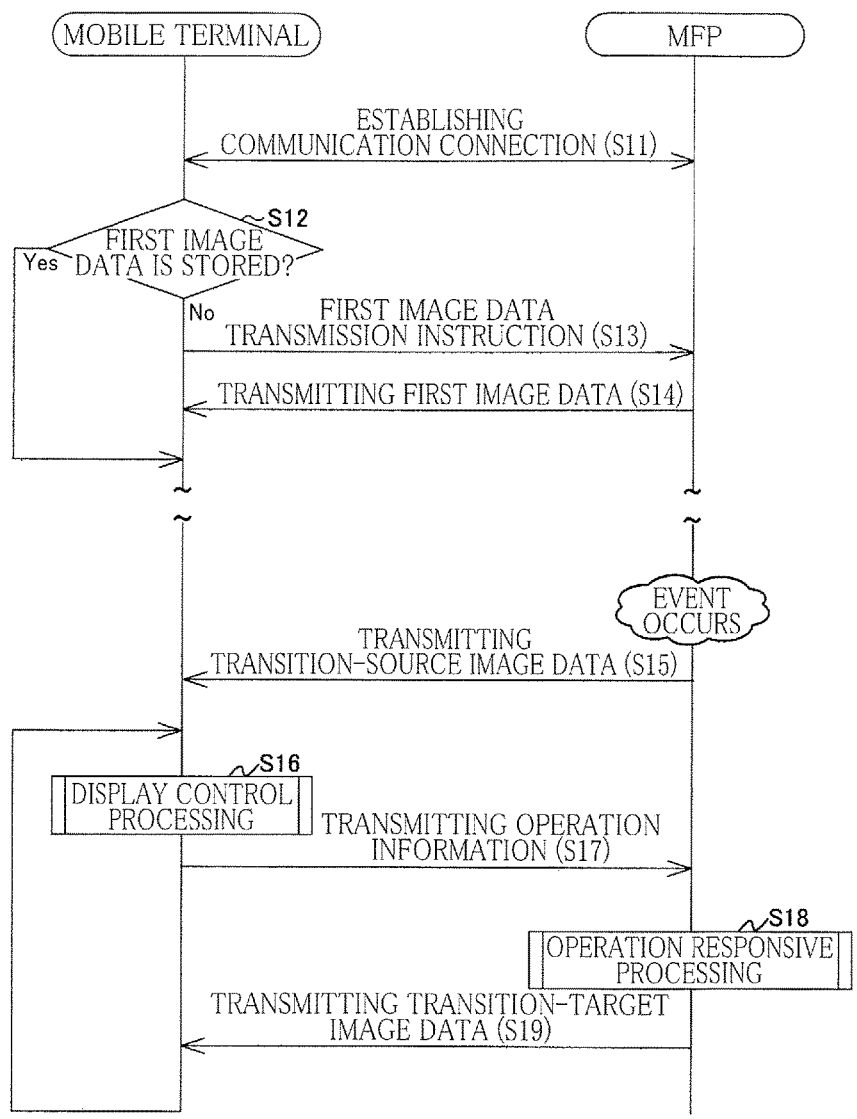
FIG. 3 is a sequence diagram illustrating operations of the image processing system.

There will be next explained operations of the image processing system 100 in the present embodiment with reference to FIGS. 3-12. Each processing explained below causes the display 53 of the mobile terminal 50 to display an image for operating the MFP 10 and operates the MFP 10 based on an instruction received from a user via the mobile terminal 50. The processing in FIG. 3 is started when an operation of tapping on an object "Remote Activation" is received by the operating unit 54 in a state in which a menu screen is displayed on the mobile terminal 50 in FIG. 2B, for example.

This processing begins with S11 at which the terminal control program 61 of the mobile terminal 50 establishes a communication connection with the MFP 10. The communication connection may be established between the MFP 10 and the mobile terminal 50 using three-way handshake for TCP (Transmission Control Protocol), for example. That is, the terminal control program 61 controls the communicating device 55 to transmit a SYN packet to the MFP 10, then receives via the communicating device 55 a SYN-ACK packet transmitted from the MFP 10, and finally controls the communicating device 55 to transmit an ACK packet back to the MFP 10. This process establishes a logical communication path between the MFP 10 and the mobile terminal 50.

The terminal control program 61 at S12 determines whether first image data is stored in the data storage area 58B or not. When the first image data is not stored in the data storage area 58B (S12: No), the terminal control program 61 at S13 controls the communicating device 55 to transmit first image data transmission instruction to the MFP 10 and at S14 controls the communicating device 55 to receive the first image data from the MFP 10. When the first image data is stored in the data storage area 58B (S12: Yes), the terminal control program 61 skips S13 and S14. That is, the processings at S13 and S14 are executed only in the first communication between the MFP 10 and the mobile terminal 50 in the present embodiment.

It is noted that the first image data is representative of a first image on which are arranged a plurality of objects respectively indicating a plurality of push-buttons mounted on the MFP 10. That is, the first image in the present embodiment contains objects respectively indicative of the numeric buttons "0"-"9", the "*" button, the "#" button, the Return button, the Home button, and the "x" button.

Figure 5A:
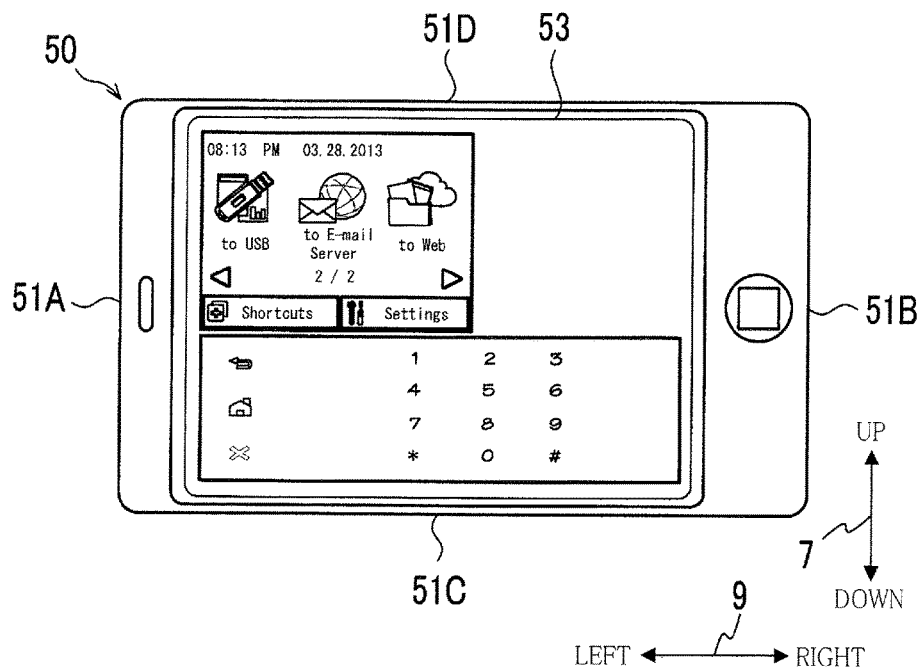
Figure 6A:
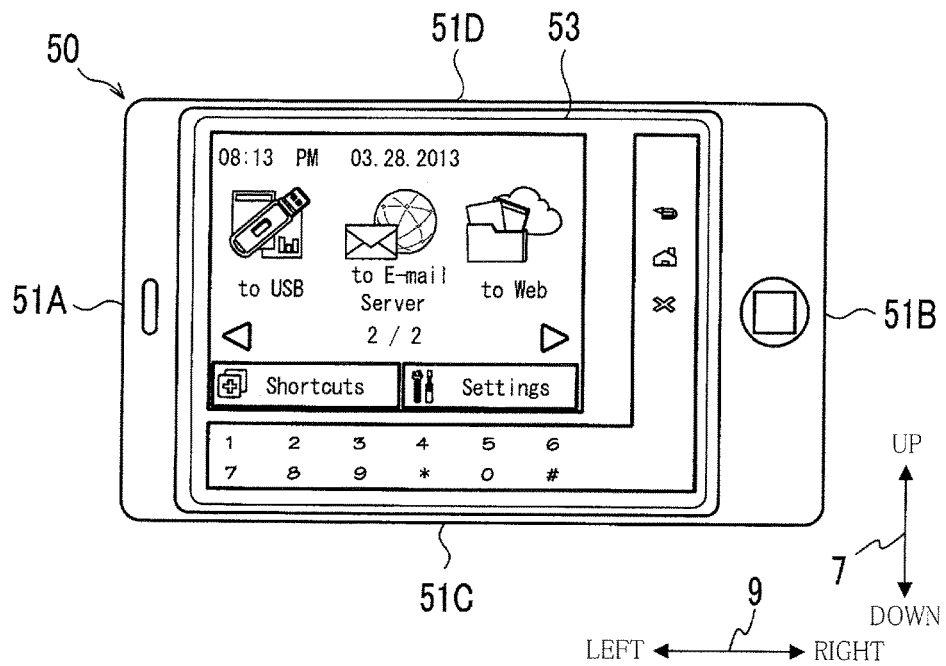

Examples of the first image data include data representative of a standard first image illustrated in FIG. 5A and data representative of a deformed first image illustrated in FIG. 6A. The standard first image is a rectangular image containing a plurality of objects arranged in a first layout which is generally the same as a layout of the plurality of push-buttons mounted on the MFP 10. The deformed first image is an image containing a plurality of objects arranged in a second layout that differs from the first layout. In the present embodiment, the deformed first image has an L-shape flipped in the right and left direction (hereinafter may be referred to as "reversed L-shape"). The second layout is a layout in which a display area of a second image which will be described below on the display 53 can be made larger than that of the first layout.

When an event occurs in the MFP 10, the image processing program 21 of the MFP 10 at S15 controls the communicating device 15 to transmit the transition-source image data to the mobile terminal 50. It is noted that the event in the present specification may indicate any change of state in the MFP 10. Examples of the event include: a start and an end of the printing operation performed by the printer 11; a switch of the image displayed on the display 13; and the establishment of the communication connection between the MFP 10 and the mobile terminal 50 (S11).

The transition-source image data and the transition-target image data respectively represent the transition-source image and the transition-target image each of which is to be displayed on the display 13 of the MFP 10 for accepting or receiving an instruction of operating the printer 11 or the scanner 12. In the present embodiment, as illustrated in FIGS. 5A, 5B, 6A, and 6B, the transition-source image is a rectangular image which is longer in the right and left direction than in the up and down direction and contains a plurality of objects such as "to USB", "to E-mail Server", "Shortcuts", and "Settings". Also, the transition-target images are respectively associated with the objects contained in the transition-source image.

Each of the objects contained in the transition-source image displayed on the display 13 of the MFP 10 is assigned with link information. The link information indicates a relationship between the object, and a processing to be executed upon selection of the object and the transition-target image to be displayed on the display 13. When the operating unit 14 has received an operation for selecting one of the objects contained in the transition-source image displayed on the display 13, the image processing program 21 of the MFP 10 executes a processing associated with the object and displays the transition-target image associated with the object on the display 13. The image processing program 21 of the MFP 10 sends the mobile terminal 50 the transition-source image data from which the link information is deleted.

It is noted that the transition-source image and the transition-target image in the present specification indicates a relative relationship between two images associated with each other by an object. For example, the transition-source image illustrated in each of FIGS. 5A, 5B, 6A, and 6B may serve as a transition-target image for another image. This applies to the transition-target image. Each of the transition-source image and the transition-target image is one example of the second image, and each of the transition-source image data and the transition-target image data is one example of second image data.

When the transition-source image data is at S15 received from the MFP 10 via the communicating device 55, the terminal control program 61 of the mobile terminal 50 at S16 executes a display control processing. There will be next explained the display control processing with reference to FIG. 4. In the display control processing, the first image and the second image are displayed on the display 53, and an instruction input by the user having operated the operating unit 54 is output to the MFP 10.

This flow begins with S21 at which the mobile terminal 50 receives the second image data from the MFP 10 via the communicating device 55. The terminal control program 61 of the mobile terminal 50 at S22 checks the priority mode information stored in the data storage area 58B. Also, the terminal control program 61 receives from the OS 20 the size of a display region of the display 53. The terminal control program 61 at S23-S28 changes the sizes of the first image and the second image based on set values of the priority mode information and the size of the display region of the display 53. In the present embodiment, the sizes of the first image and the second image are changed in a state in which an aspect ratio (i.e., a horizontal to vertical ratio) of each image is fixed.

In the following explanation, it is assumed that the display control processing is executed in a state in which the upper side 51A of the housing 51 faces leftward, the lower side 51B faces rightward, the left side 51C faces downward, and the right side 51D faces upward as illustrated in FIGS. 5A, 5B, 6A, and 6B. That is, in the present embodiment, the display region of the display 53 has a rectangular shape that is longer in its lengthwise direction coinciding with the horizontal direction than in its widthwise direction coinciding with the vertical direction. It is noted that the size of the display region is expressed by a combination of the number of pixels thereof in the up and down direction 7 and the number of pixels thereof in the right and left direction 9, for example. That is, the number of pixels in the up and down direction 7 and the number of pixels in the right and left direction 9 are reverse to each other between the size of the display region which is received in a state in which the housing 51 is in the orientation illustrated in FIG. 5A and the size of the display region which is received in a state in which the housing 51 is in the orientation illustrated in FIG. 10A.

It is noted that the terminal control program 61 may at S21 receive selection effectiveness information with the second image data. The selection effectiveness information indicates that each object contained in the first image is operable or inoperable in the state in which the second image based on the second image data is displayed on the display 53. Also, the terminal control program 61 may at S21 receive display-area identifying information with the second image data. The display-area identifying information is for identifying a display area of the display 53 on which the second image is to be displayed. That is, the second image in the case where the display-area identifying information is received is larger than the display region of the display 13 of the MFP 10. The terminal control program 61 having received the display-area identifying information executes the following processings for images displayed on the display area of the second image.

The priority mode information indicates one of (i) a first image-size priority mode as one example of a first-image priority mode in which the first image is enlarged with higher priority than the second image among the plurality of images displayed on the display 53, (ii) a second image-size priority mode as one example of a second-image priority mode in which the second image is enlarged with higher priority than the first image, and (iii) a layout priority mode in which the first image is fixed in the first layout. A value set in the priority mode information may be a preset default value or may be a value set by a user. In the case where the user sets a value of the priority mode information, for example, the user taps on a "Priority Mode Setting" object on the menu screen illustrated in FIG. 2B to display a priority mode setting screen, not shown, and sets a desired value for the priority mode information on the priority mode setting screen.

When the priority mode information indicates the layout priority mode (S22: LAYOUT PRIORITY MODE), the terminal control program 61 at S23 changes the size of the standard first image to a second size and at S24 changes the size or shape of the second image to a maximum size in which the second image can be displayed on a display area remaining after the standard first image of the second size is disposed. When the priority mode information indicates the first image-size priority mode (S22: FIRST IMAGE-SIZE PRIORITY MODE), the terminal control program 61 at S25 changes the size of the deformed first image to the first size and at S26 changes the size or shape of the second image to a maximum size in which the second image can be displayed on a display area remaining after the deformed first image of the first size is disposed. When the priority mode information indicates the second image-size priority mode (S22: SECOND IMAGE-SIZE PRIORITY MODE), the terminal control program 61 at S27 changes the size of the deformed first image to the second size and at S28 changes the size or shape of the second image to a maximum size in which the second image can be displayed on a display area remaining after the deformed first image of the second size is disposed.

Figure 5B:
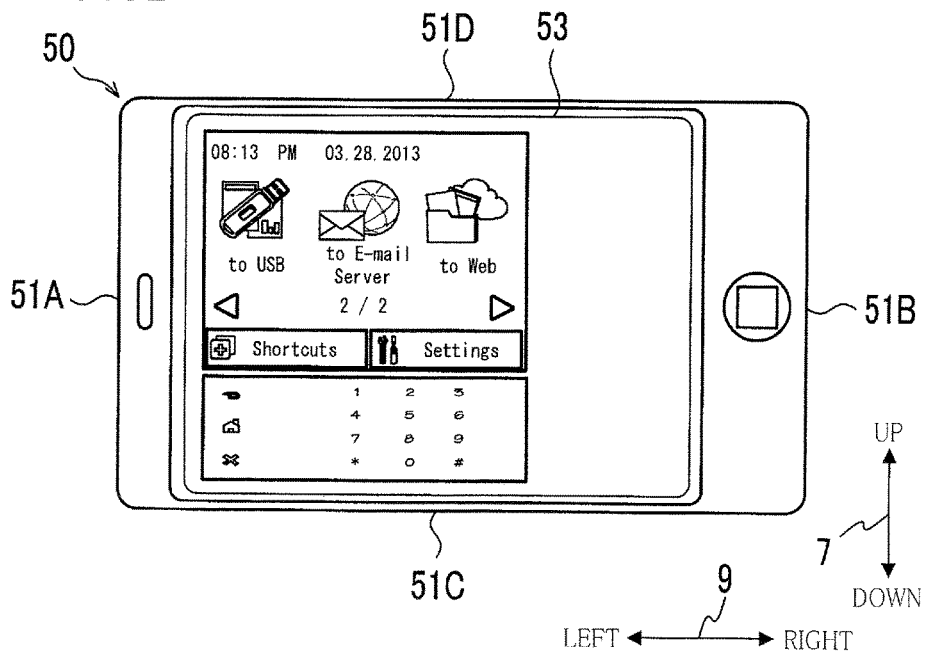
Figure 6B:
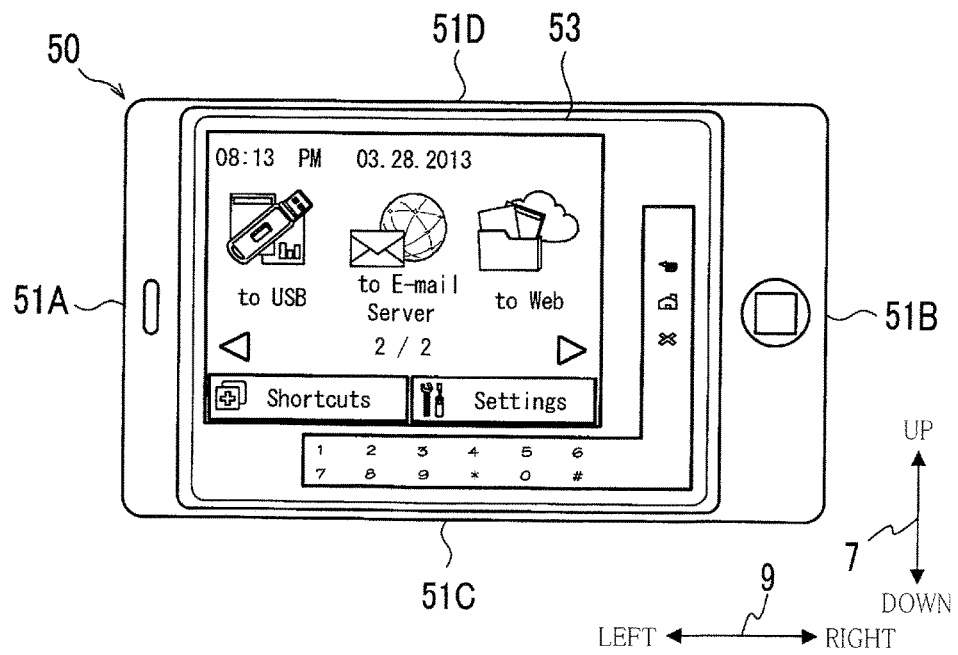

The terminal control program 61 at S29 controls the display 53 to display the first image and the second image whose sizes are changed at S23-S28. FIG. 5B illustrates one example of display of the first image and the second image whose sizes are changed at S23 and S24. FIG. 6A illustrates one example of display of the first image and the second image whose sizes are changed at S25 and S26. FIG. 6B illustrates one example of display of the first image and the second image whose sizes are changed at S27 and S28. FIG. 5A illustrates one example of display of the standard first image of the first size and the second image whose size is changed to the maximum size in which the second image can be displayed on a display area remaining after the standard first image of the first size is disposed.

Figure 10A:
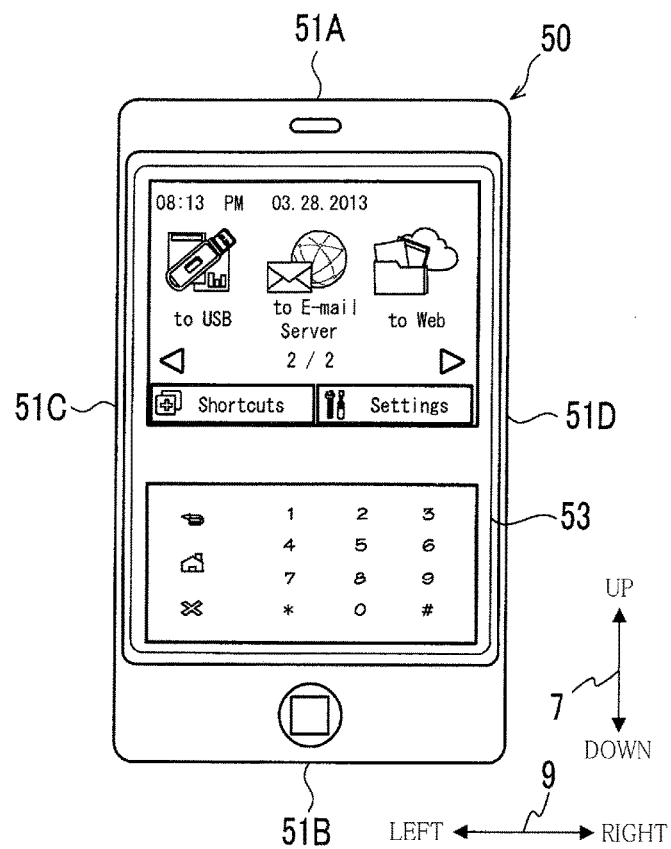

In the present embodiment, as illustrated in FIGS. 5A and 5B, the standard first image is an rectangular image which is longer in the right and left direction than in the up and down direction and disposed adjacent to the second image in the widthwise direction of the display 53. As illustrated in FIG. 10A, the standard first image may be disposed adjacent to the second image in the lengthwise direction of the display 53. As illustrated in FIGS. 6A and 6B, the deformed first image has a reversed L-shape along the lower side 51B and the left side 51C of the housing 51, and the second image is disposed in the rest of the display region.

Here, the wording "maximum size in which the second image can be displayed" in the present specification indicates a line showing the outer edge of the second image contacts the first image or a line showing the outer edge of the second image contacts an edge of the display region of the display 53, for example. Each of FIGS. 5A and 5B illustrates an example in which a right edge of the second image does not contact any edge of the display region of the display 53, but a lower edge of the second image contacts the first image. Also, each of FIGS. 6A and 6B illustrates an example in which a right edge of the second image does not contact the first image, but a lower edge of the second image contacts the first image. Also, FIG. 10A illustrates an example in which a lower edge of the second image does not contact the first image, but a right edge of the second image contacts an edge of the display region of the display 53. However, the second image is not necessarily enlarged to a size in which the second image contacts the first image or an edge of the display region, and a size creating a specific margin between the second image and the first image or the edge of the display region may be defined as the maximum size.

As illustrated in FIGS. 5A, 5B, 6A, and 6B, the standard first image and the deformed first image of the same size contain the same size of the objects. The first size and the second size may be the maximum size and the minimum size of the first image, respectively. That is, the second size is smaller than the first size. It is noted that the maximum size and the minimum size can be determined as needed with consideration of viewability, operability, and the like of the objects contained in the first image and the second image adjacent thereto. Also, the size of the first image is not limited to the two sizes, i.e., the first size and the second size.

The standard first image of the second size illustrated in FIG. 5B has the same layout of the objects and the small size of each object when compared with the standard first image of the first size illustrated in FIG. 5A. The size of the second image illustrated in FIG. 5B is large when compared with the second image illustrated in FIG. 5A. That is, the layout priority mode is a mode for displaying the second image of the largest size in a state in which the layout of the first image is fixed to the first layout.

The deformed first image of the first size illustrated in FIG. 6A has the same size of each object and a different layout of the objects when compared with the standard first image of the first size illustrated in FIG. 5A. Also, the size of the second image illustrated in FIG. 6A is large when compared with the second image illustrated in FIGS. 5A and 5B. That is, the first image-size priority mode is a mode for displaying the second image of the largest size in a state in which the size of each object contained in the first image is kept.

The deformed first image of the second size illustrated in FIG. 6B has the same layout of the objects and the small size of each object when compared with the deformed first image of the first size illustrated in FIG. 6A. The size of the second image illustrated in FIG. 6B is large when compared with the second image illustrated in FIG. 6A. That is, the second image-size priority mode is a mode for displaying the second image of the largest size in a state in which minimum amounts of viewability, operability, and the like of the objects contained in the first image are kept.

Figure 10B:
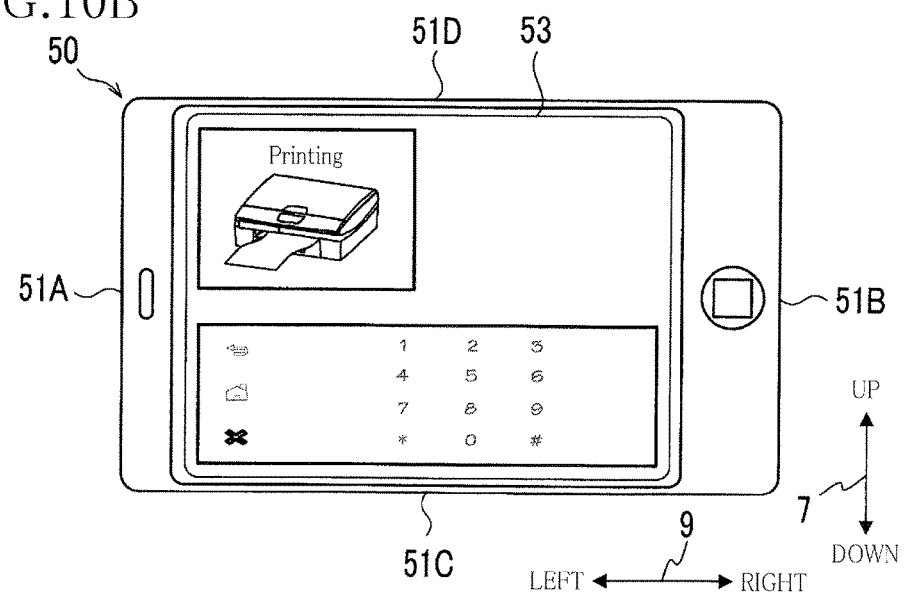
Figure 11:
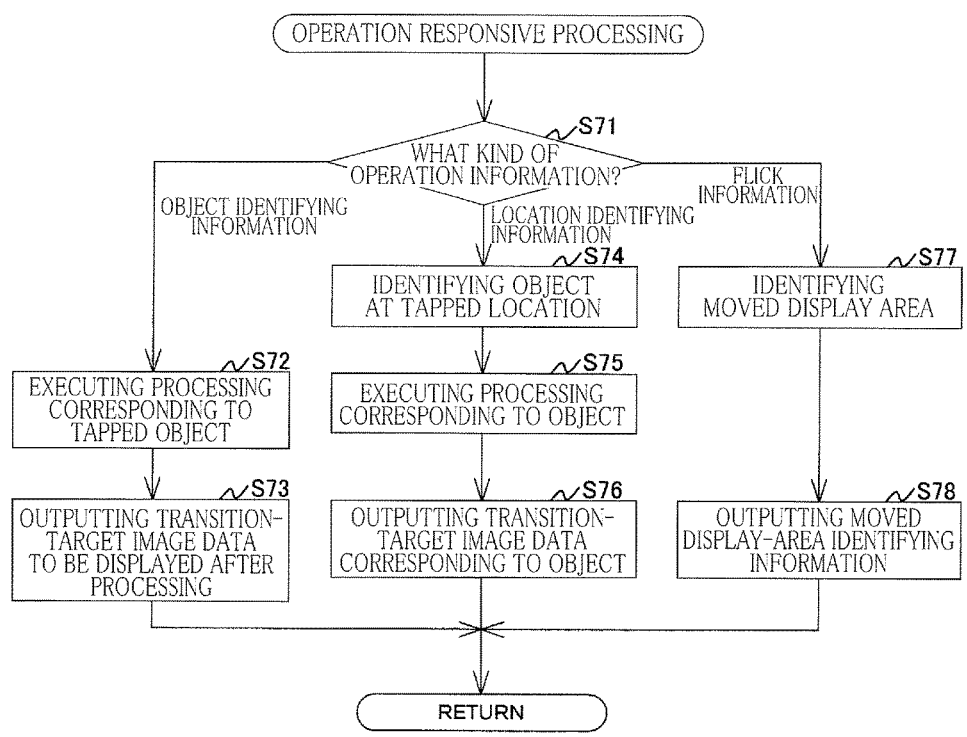
FIG. 11 is a flow chart illustrating an operation responsive processing.

In the case where the terminal control program 61 has received the selection effectiveness information at S21, the terminal control program 61 may control the display 53 to display the first image in which a display manner of objects indicated as being effective by the selection effectiveness information is different from that of objects indicated as being ineffective by the selection effectiveness information. For example, FIG. 5A illustrates an example of display in which the "x" object is ineffective, and the other objects are effective. That is, the MFP 10 displaying the second image illustrated in FIG. 5A is in a standby state in which the MFP 10 is not executing a processing to be suspended. FIG. 10B illustrates an example of display in which the "x" object is effective, and the other objects are ineffective. That is, the MFP 10 displaying the second image illustrated in FIG. 10B can suspend a printing operation being performed, in response to a selection of the "x" object.

At S30, the terminal control program 61 waits until an input operation by the user is received. The operating unit 54 at S30 senses an operation on the display screen of the display 13 such as a pinch operation, a tap operation, and a flick operation. The pinch operation includes a pinch-in operation in which input objects contacting two locations on the display screen are slid in directions closer to each other, and a pinch-out operation in which the input objects contacting two locations on the display screen are slid in directions away from each other. The tap operation is an operation in which one input object is brought into contact with a single location on the display screen (hereinafter may be referred to as "tapped location") and moved off the display screen immediately afterward. The flick operation is an operation in which the input object contacting the display screen is slid at acceleration greater than threshold acceleration. It is noted that examples of the input object include user's finger and a stylus. The orientation sensor 56 senses an operation for changing the orientation of the housing 51.

The pinch operation on the second image displayed on the display 53 is sensed by the operating unit 54 (S30: PINCH OPERATION ON SECOND IMAGE), the terminal control program 61 at S31 executes an image-size adjustment processing. The pinch operation is one example of a size changing instruction for changing the size of the second image displayed on the display 53 to a designated size. In the present embodiment, the designated size is determined according to an amount of sliding of the input object in the pinch operation. For example, a reduction ratio of the second image increases with increase in the amount of sliding of the input object in the pinch-in operation. Also, an enlargement ratio of the second image increases with increase in the amount of sliding of the input object in the pinch-out operation.

The image-size adjustment processing is a processing for adjusting the sizes of the first image and the second image displayed on the display 53 based on the designated size contained in the size changing instruction and the priority mode information stored in the data storage area 58B. In the present embodiment, the sizes of the first image and the second image are adjusted in a state in which the aspect ratio is fixed. There will be next explained the image-size adjustment processing with reference to FIGS. 7-9.

Figure 7:
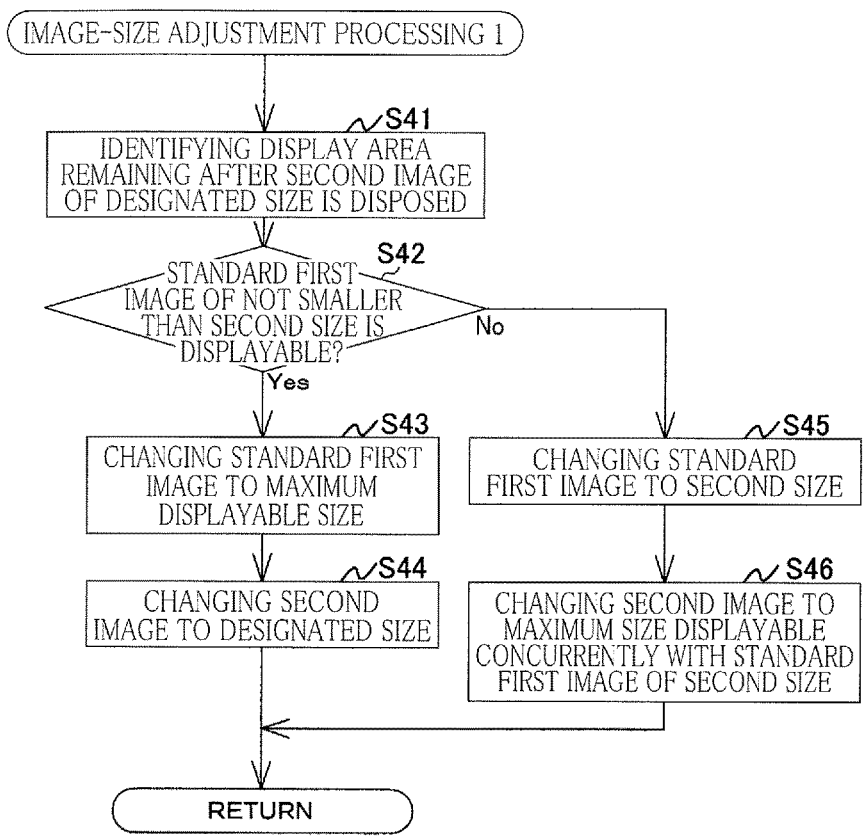
FIG. 7 is a flow chart illustrating an image-size adjustment processing in a case where priority mode information indicates a layout priority mode.

FIG. 7 is a flow chart illustrating the image-size adjustment processing in a case where the priority mode information indicates the layout priority mode. This flow begins with S41 at which the terminal control program 61 assumes that the second image whose size is increased or reduced to the designated size is displayed on the display 53, and identifies the shape and size of a display area on which the first image can be displayed. The terminal control program 61 at S42 determines layouts and sizes of the first image displayable on the display area identified at S41.

When the standard first image of larger than or equal to the second size is displayable (S42: Yes), the terminal control program 61 at S43 changes the size of the standard first image to the largest one of the determined sizes and at S44 changes the size of the second image to the designated size. When the standard first image of smaller than the second size is displayable (S42: No), the terminal control program 61 at S45 changes the size of the standard first image to the second size and at S46 changes the second image to the maximum size in which the second image can be displayed on a display area remaining after the standard first image of the second size is disposed.

Figure 8:
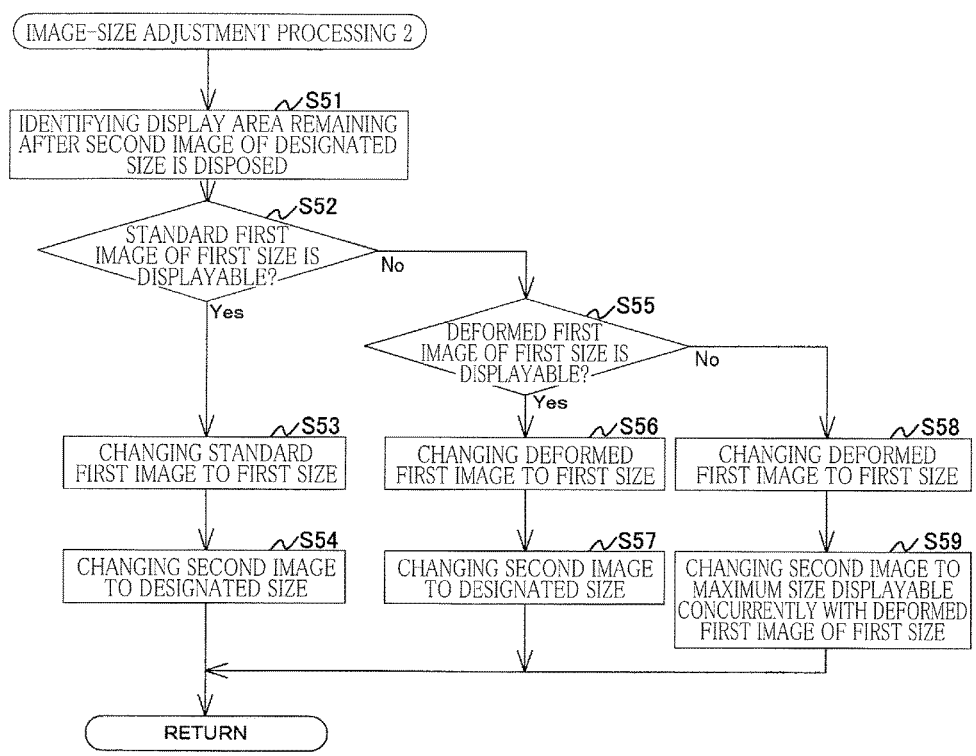
FIG. 8 is a flow chart illustrating the image-size adjustment processing in a case where the priority mode information indicates a first image-size priority mode.

FIG. 8 is a flow chart illustrating the image-size adjustment processing in a case where the priority mode information indicates the first image-size priority mode. A processing at S51 is similar to the processing at S41 in FIG. 7, and an explanation thereof is dispensed with. The terminal control program 61 at S52 and S55 determines layouts and sizes of the first image displayable on the display area identified at S51.

When the standard first image of the first size is displayable (S52: Yes), the terminal control program 61 at S53 changes the size of the standard first image to the first size and at S54 changes the size of the second image to the designated size. When the standard first image of the first size is not displayable (S52: No) and when the deformed first image of the first size is displayable (S55: Yes), the terminal control program 61 at S56 changes the size of the deformed first image to the first size and at S57 changes the size of the second image to the designated size. When the deformed first image of the first size is not displayable (S55: No), the terminal control program 61 at S58 changes the size of the deformed first image to the first size and at S59 changes the size of the second image to the maximum size in which the second image can be displayed on a display area remaining after the deformed first image of the first size is disposed.

Figure 9:
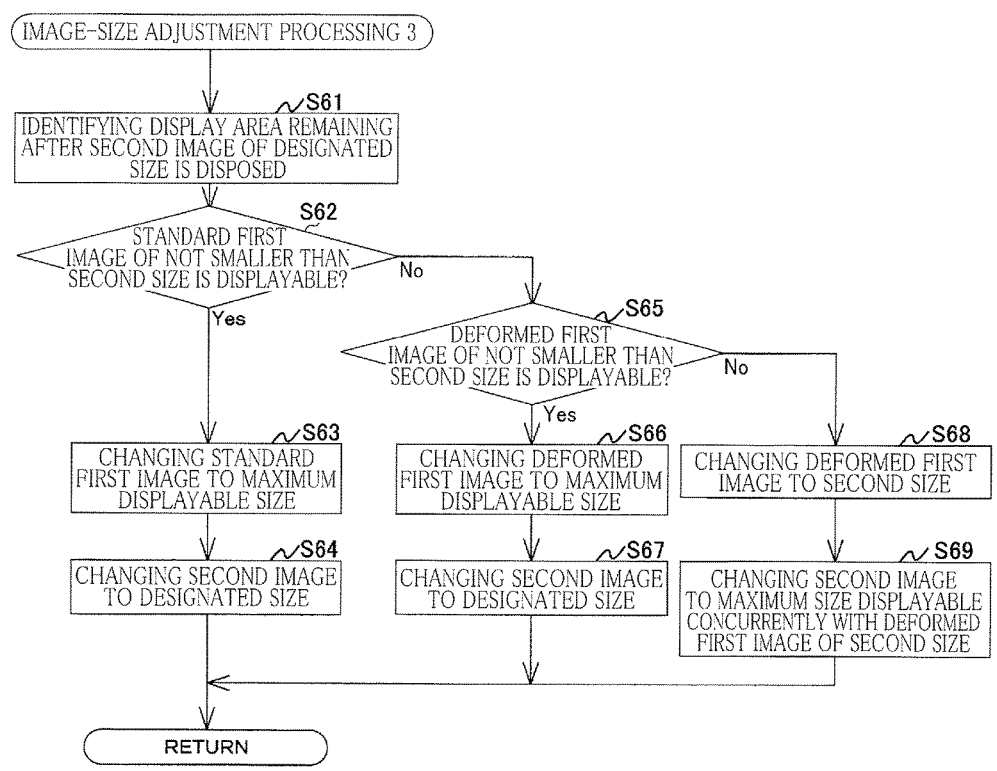
FIG. 9 is a flow chart illustrating the image-size adjustment processing in a case where the priority mode information indicates a second image-size priority mode.

FIG. 9 is a flow chart illustrating the image-size adjustment processing in a case where the priority mode information indicates the second image-size priority mode. A processing at S61 is similar to the processing at S41 in FIG. 7, and an explanation thereof is dispensed with. The terminal control program 61 at S62 and S65 determines layouts and sizes of the first image displayable on the display area identified at S61.

When the standard first image of larger than or equal to the second size is displayable (S62: Yes), the terminal control program 61 at S63 changes the size of the standard first image to the largest one of the determined sizes and at S64 changes the size of the second image to the designated size. When the standard first image of the second size is not displayable (S62: No) and when the deformed first image of larger than or equal to the second size is displayable (S65: Yes), the terminal control program 61 at S66 changes the deformed first image to the largest one of the determined sizes and at S67 changes the size of the second image to the designated size. When the deformed first image of larger than or equal to the second size is not displayable (S65: No), the terminal control program 61 at S68 changes the size of the deformed first image to the second size and at S69 changes the second image to the maximum size in which the second image can be displayed on a display area remaining after the deformed first image of the second size is disposed.

Figure 4:
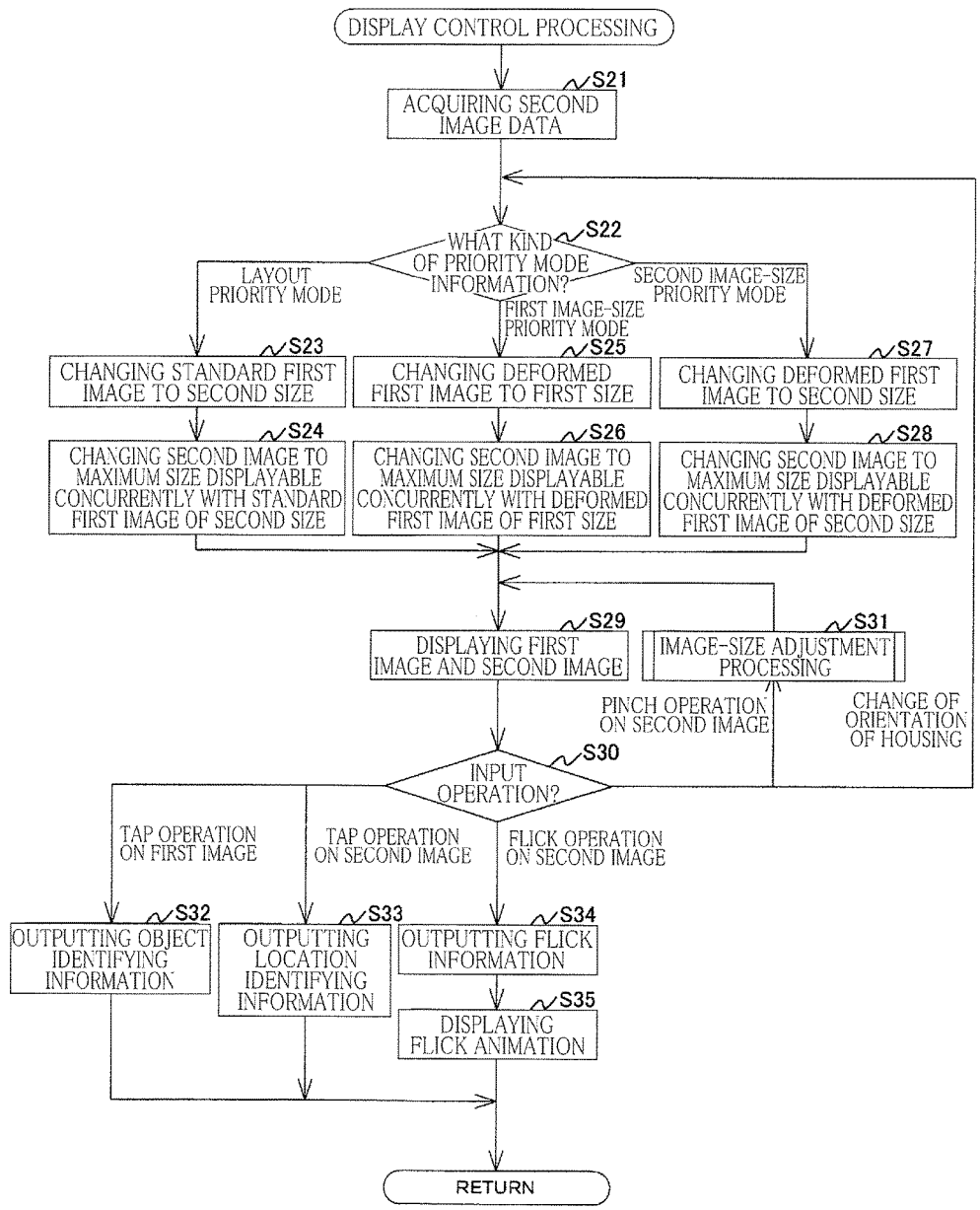
FIG. 4 is a flow chart illustrating a display control processing.

The terminal control program 61 thereafter goes back to the flow in FIG. 4 and at S29 controls the display 53 to display again the first image and the second image whose sizes have been adjusted in the image-size adjustment processing (S31) and at S30 waits again until an input operation by the user is received.

When a change of the orientation of the housing 51 is sensed by the orientation sensor 56 (S30: CHANGE OF ORIENTATION OF HOUSING), the terminal control program 61 executes the processings at S22 and subsequent steps. The terminal control program 61 executes the processings at S22-S29 when the orientation of the housing 51 is changed from an orientation of the housing 51 illustrated in FIG. 5A in which the lengthwise direction of the display 53 coincides with the horizontal direction, to an orientation of the housing 51 illustrated in FIG. 10A in which the widthwise direction of the display 53 coincides with the horizontal direction, for example. Likewise, the terminal control program 61 executes the processings at S22-S29 when the orientation of the housing 51 is changed from the orientation illustrated in FIG. 10A to the orientation illustrated in FIG. 5A. As a result, the first image and the second image are displayed in a layout that matches the changed orientation of the display 53.

When a tap operation on the first image displayed on the display 53 is sensed by the operating unit 54 (S30: TAP OPERATION ON FIRST IMAGE), the terminal control program 61 at S32 controls the communicating device 55 to output object identifying information to the MFP 10. The tap operation is one example of an operation of selecting an object disposed at the tapped location. The object identifying information is for identifying an object displayed at the tapped location among the objects contained in the first image, and the object identifying information corresponds to the button identifying information.

In the case where the selection effectiveness information is received at S21, the terminal control program 61 may output the object identifying information only in the case where the object displayed at the tapped location is effective. In this configuration, for example, in a case where the operating unit 54 has sensed a tap operation performed on a location of an object indicated as being effective by the selection effectiveness information among the objects contained in the first image displayed on the display 53, the terminal control program 61 controls the communicating device 55 to send the MFP 10 object identifying information for identifying the object.

When a tap operation performed on the second image displayed on the display 53 is sensed by the operating unit 54 (S30: TAP OPERATION ON SECOND IMAGE), the terminal control program 61 at S33 controls the communicating device 55 to output location identifying information to the MFP 10. The location identifying information is for identifying a location corresponding to the tapped location on the second image having its original size, i.e., on the second image received at S21. Specifically, the operating unit 54 outputs the location identifying information for identifying a tapped location on the second image displayed on the display 53, i.e., on the second image whose size has been changed. To perform this output, for example, the terminal control program 61 multiplies the location identifying information transmitted from the operating unit 54, by an inverse of the enlargement ratio or the reduction ratio of the second image.

The location identifying information can be expressed as coordinates (x, y) on an xy plane in which an upper left corner of the second image is defined as the origin point, a right direction as a positive direction in the x axis, and a down direction as a positive direction in the y axis, for example. The location identifying information transmitted at S33 may identify a certain location, e.g., a center of a particular area on the second image which corresponds to the size of a distal end of the input object.

When a flick operation performed on the second image displayed on the display 53 is sensed by the operating unit 54 (S30: FLICK OPERATION ON SECOND IMAGE), the terminal control program 61 at S34 controls the communicating device 55 to output flick information to the MFP 10. The flick operation is one example of an operation for moving a display area on the second image. This flick operation causes a display on which the second image is slid on the display 53. The flick information contains a moving direction and acceleration of the input object in the flick operation. The terminal control program 61 at S35 displays flick animation on the display 53. The flick animation will be described later in detail.

Returning to FIG. 3, when operation information is received from the mobile terminal 50 by the communicating device 15 (S17), the image processing program 21 of the MFP 10 at S18 executes an operation responsive processing. The operation information is the object identifying information, the location identifying information, or the flick information. The operation responsive processing is a processing associated with the operation information received from the mobile terminal 50. There will be next explained the operation responsive processing with reference to FIG. 11.

When object identifying information is received from the mobile terminal 50 (S71: OBJECT IDENTIFYING INFORMATION), the image processing program 21 of the MFP 10 at S72 executes a processing corresponding to an object identified by the object identifying information. The image processing program 21 at S73 controls the communicating device 15 to send the mobile terminal 50 transition-target image data representative of a transition-target image associated with the object identified by the object identifying information. When there is no processing corresponding to the received object identifying information, the image processing program 21 skips S72.

For example, in a case where a user has tapped on a location of a Home object on the screen illustrated in FIG. 5A, the image processing program 21 at S73 controls the communicating device 15 to send the mobile terminal 50 transition-target image data representative of a transition-target image to be displayed as a Home screen. In a case where a user has tapped on a "5" object in a state in which a "Number of Copies" screen for the printing operation is displayed on the mobile terminal 50 as the transition-source image, the image processing program 21 at S72 stores five as the number of copies in the printing operation and at S73 controls the communicating device 15 to send the mobile terminal 50 transition-target image data representative of a "Number of Copies" screen on which the number "5" is displayed in a box for the number of copies.

When location identifying information is received from the mobile terminal 50 (S71: LOCATION IDENTIFYING INFORMATION), the image processing program 21 at S74 identifies a location on the second image which is identified by the location identifying information, i.e., the object disposed at the tapped location. When an object is disposed at the tapped location, the image processing program 21 at S75 executes a processing corresponding to the object. The image processing program 21 at S76 controls the communicating device 15 to send the mobile terminal 50 transition-target image data which is stored in the data storage area 18B so as to be associated with the object. In a case where there is no processing corresponding to the identified object, the image processing program skips S75.

For example, in a case where a user has tapped on a location of a "to USB" object on the screen illustrated in FIG. 5A, the image processing program 21 at S75 controls the scanner 12 to perform a scanning operation and store image data created in the scanning operation, into a USB memory. The image processing program 21 at S76 controls the communicating device 15 to send the mobile terminal 50 transition-target image data representative of a transition-target image indicating that the scanning operation is being performed.

When flick information is received from the mobile terminal 50 (S71: FLICK INFORMATION), the image processing program 21 at S77 identifies, based on the moving direction and the acceleration contained in the flick information, a location of a moved display area on the transition-source image and at S78 controls the communicating device 15 to send the mobile terminal 50 display-area identifying information indicating the display area. Specifically, the image processing program 21 moves the display area on the second image, in a direction opposite the moving direction contained in the flick information, by a distance which increases with increase in acceleration contained in the flick information.

Figure 12A:
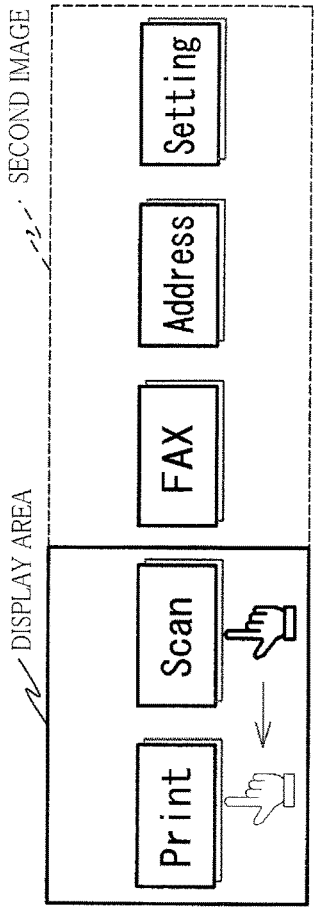
Figure 12B:
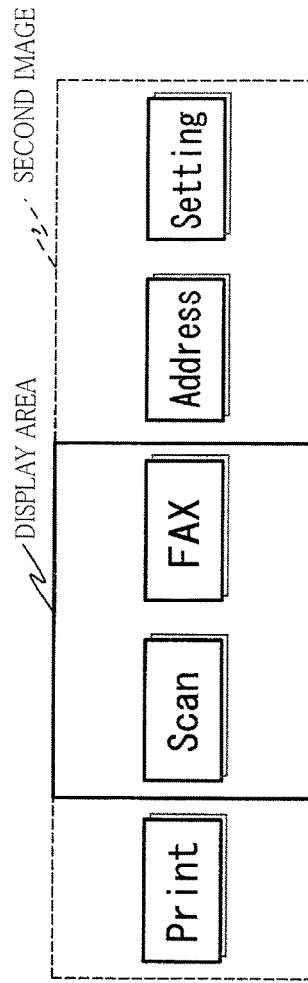
Figure 12C:
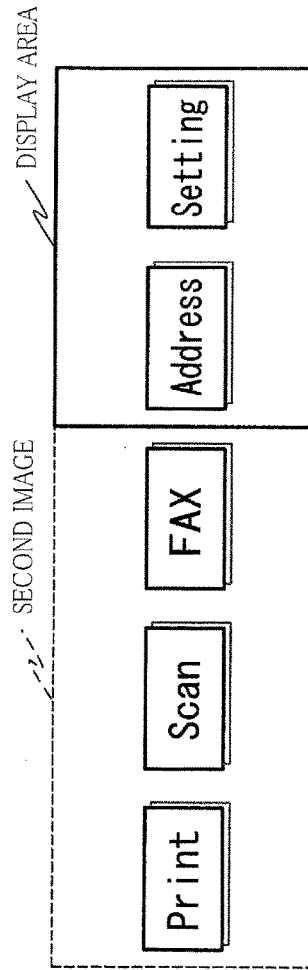

For example, in a case where a display area set on a left end of a second image illustrated in FIG. 12A which is elongated in the right and left direction, when a user has performed a flick operation for sliding an input object in the left direction, the display area is moved in the right direction on the second image as illustrated in FIGS. 12B and 12C. In a case where the moved display area identified at S77 is located at a location illustrated in FIG. 12C, display-area identifying information indicating the display area is at S78 output to the mobile terminal 50. It is noted that in the case where the operation responsive processing (S77 and S78) corresponding to the flick operation is executed, the MFP 10 may output only the display-area identifying information to the mobile terminal 50 without outputting the second image data.

Returning to FIG. 3 again, the terminal control program 61 of the mobile terminal 50 executes the display control processing (S16) again when the transition-target image data is received from the MFP 10 via the communicating device 55. It is noted that the display control processing (S16) after the transition-target image data is received is similar to the above-described processing, and an explanation thereof is dispensed with. However, flick animation is displayed on the display 53 before the second image contained in a new display area is displayed on the display 53 in the display control processing (S16) executed after the flick operation.

Specifically, the terminal control program 61 sequentially moves the display area on the second image based on the moving direction and the acceleration contained in the flick information and controls the display 53 to display images contained in the display area in order. For example, in a case where a flick operation is performed on a display area illustrated in FIG. 12A, and display-area identifying information indicating a display area illustrated in FIG. 12C is newly received, the terminal control program 61 sequentially moves the display area from the position illustrated in FIG. 12A to the position illustrated in FIG. 12C and controls the display 53 to display the second images contained in the display areas in order.

Effects in Present Embodiment

In the present embodiment, the first image and the second image of appropriate sizes are displayed in an appropriate layout on the display 53 based on a preset value of the priority mode information. Thus, the display 53 does not display the first image and the second image in sizes and layout which deteriorates the operability. That is, the present invention can offer an easy-to-use interface to a user who inputs various complicated instructions into the MFP 10. For example, the user having selected the layout priority mode can operate the mobile terminal 50 in the same way as the user operates the push-buttons mounted on the MFP 10. The user having selected the first image-size priority mode can easily select an object on the first image. The user having selected the second image-size priority mode can easily select an object on the second image.

Modifications

In the above-described embodiment, the image to be displayed on the display 13 of the MFP 10 and the second image transmitted from the MFP 10 to the mobile terminal 50 may not be completely the same as each other as long as these images are similar in such a degree that a user can recognize at first glance that these images are the same. For example, the second image data representative of the second image in which an aspect ratio and/or a resolution of an image to be displayed have been adjusted may be transmitted from the MFP 10 to the mobile terminal 50. Likewise, the first layout of the standard first image in the above-described embodiment may not be completely the same as the layout of the push-buttons mounted on the MFP 10. The first image data may not be received from the MFP 10 and may be received from a server device on the Internet, for example.

The second layout of the deformed first image is not limited the layouts illustrated in FIGS. 6A and 6B. That is, the second layout may differ according to the shapes of the display 53 and the second image as long as a display area of the second image is larger in the second layout than in the first layout. That is, the deformed first image illustrated in each of FIGS. 6A and 6B is a layout appropriate for the case where each of the display 53 and the second image has a rectangular shape elongated in the right and left direction.

Figure 13A:
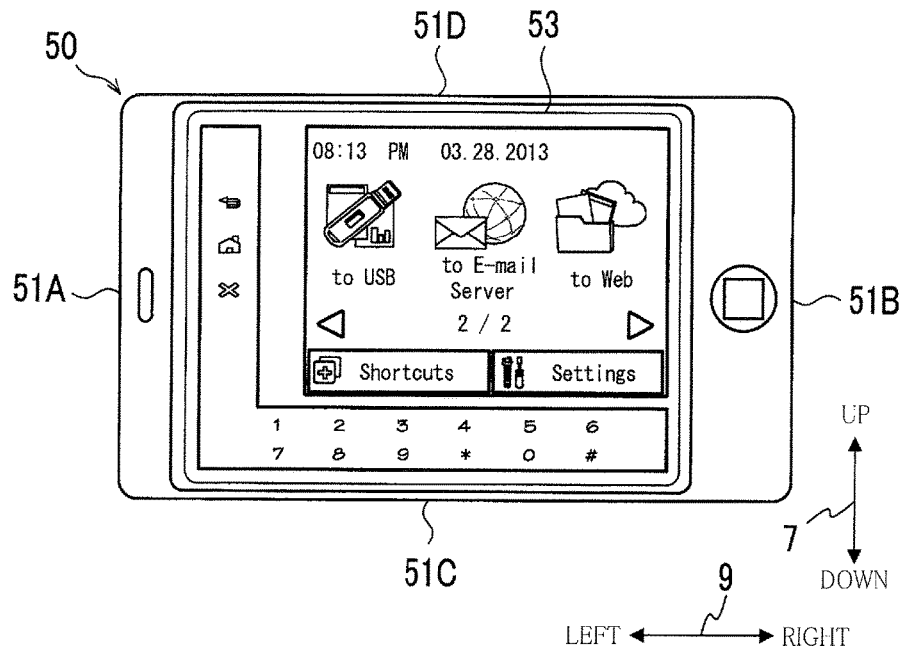
FIGS. 13A and 13B are views each illustrating an example of an arrangement of the first image and the second image displayed on the display of the mobile terminal.
Figure 13B:
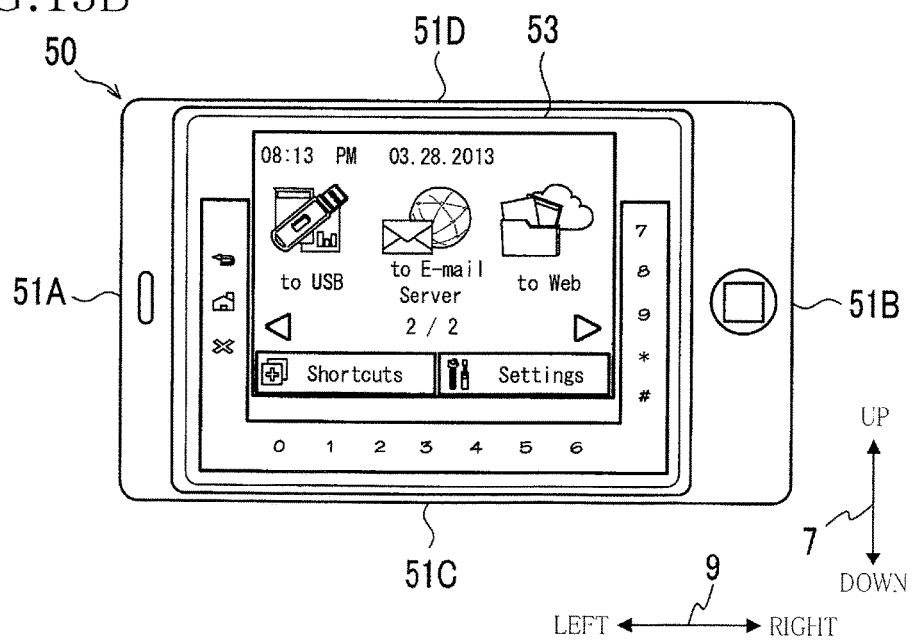

FIGS. 13A and 13B illustrate other examples of the second layout of the deformed first image. FIG. 13A illustrates an example of the deformed first image disposed in an L-shape along the upper side 51A and the left side 51C of the housing 51. FIG. 13B illustrates an example of the first image disposed in a U-shape along the upper side 51A, the left side 51C, and the lower side 51B of the housing 51. That is, when compared with a display area remaining after the first image is disposed on the display 53 in the first layout, the shape of a display area remaining after the first image is disposed on the display 53 in the second layout needs to be similar to the shape of the second image, in other words, the aspect ratio of the display area needs to be close to that of the second image.

While the layout of the first image is selected according to the priority mode information in the above-described embodiment, one of the first image-size priority mode and the second-image priority mode may be selected in a state in which the layout of the first image is fixed. In this configuration, the processings at S23 and S24 in FIG. 4 are omitted. In a case where the layout of the first image is fixed to the first layout, the size of the standard first image is changed at S25 and S27 in FIG. 4. In a case where the layout of the first image is fixed to the second layout, the size of the deformed first image is changed at S25 and S27 in FIG. 4. The other processings are the same as the above-described processings. This applies to the image-size adjustment processing.

In the above-described embodiment, the first image and the second image are enlarged at the fixed aspect ratio. In the examples in FIGS. 5A and 5B, consequently, a too large margin is formed on the right of the second image. In the example in FIG. 6B, a too large margin is formed under the second image. To solve this problem, an enlargement ratio in the up and down direction and an enlargement ratio in the right and left direction may be made different from each other, making it possible to display the larger first image and the larger second image. However, in order to reduce an amount of lowering in viewability of objects contained in each image, it is preferable that a difference between the enlargement ratio in the up and down direction and the enlargement ratio in the right and left direction is not too large. This applies to reduction of the size of the image.

In the above-described embodiment, the image-size adjustment processing is executed when the pinch operation is sensed. However, the method of inputting the size changing instruction is not limited to the pinch operation. For example, this image processing system 100 may be configured such that an object for multiplying the second image by n (n>0) is displayed on the display 53, and when an operation for the object is sensed by the operating unit 54, the image-size adjustment processing is executed.

In the image-size adjustment processing, the processings at S45 and S46 in the case where the standard first image of smaller than the second size is displayable are not limited to those in FIG. 7. For example, the state established before the size changing instruction is input may be established again without changing the sizes of the first image and the second image. This applies to the processings at S58 and S59 in FIG. 8 and the processings at S68 and S69 in FIG. 9.

In the above-described embodiment, when the flick operation is performed on the display 53, the moved display area is calculated by the MFP 10, and the display area during sliding is calculated by the mobile terminal 50, but the present invention is not limited to this configuration. For example, the mobile terminal 50 may repeatedly receive, from the MFP 10, the display areas of the second image each to be displayed on the display 53 during sliding, and control the display 53 to sequentially display the received display areas of the second image.

The above-described embodiment has focused on the processings executed when the tap operation, the flick operation, and the pinch operation are performed on the display 53. However, other operations such as a drag operation may be performed on the display 53, for example. The drag operation is the same as the flick operation in sliding the input object contacting the display screen but different from the flick operation in that a speed of sliding is lower than or equal to the threshold acceleration.

In this configuration, when the operating unit 54 has sensed a drag operation performed on the second image displayed on the display 53, the terminal control program 61 controls the communicating device 55 to send the MFP 10 drag information containing a moving direction and a distance of movement of the input object. In the operation responsive processing (S18), the image processing program 21 moves the display area of the second image in a direction opposite the moving direction contained in the drag information, by a distance which increases with increase in the distance of movement contained in the drag information. The other processings are the same as the above-described processings in the flick operation, and an explanation thereof is omitted. However, the image processing program 21 does not execute the processing at S35 for displaying flick animation.

In the MFP 10 and the mobile terminal 50 in the embodiment, the CPUs 17, 57 execute various programs stored in the program storage areas 18A, 58A of the respective storage devices 18, 58, to execute processings to be executed by a controller of the present invention. However, the configuration of the controller is not limited to this configuration. For example, the controller may be partly or entirely achieved by hardware such as an integrated circuit (IC).

The present invention is achieved by the MFP 10 or the mobile terminal 50 in the above-described embodiment but may be achieved by programs for causing the MFP 10 or the mobile terminal 50 to execute processings. The programs may be stored in a non-transitory storage medium. Examples of the non-transitory storage medium include, in addition to a CD-ROM and a DVD-ROM, a storage device mounted on a server device connectable to the MFP 10 or the mobile terminal 50 over the communication network 102. The programs stored in the storage device of the server device may be distributed, as information or signals representing the programs, over the communication network 102 such as the Internet.

What is claimed is:

1. A communication system comprising:
    an image processing apparatus; and
    a mobile terminal;
    wherein the image processing apparatus comprises:
        a first display provided on a front face of the image processing apparatus and configured to display various information,
        a plurality of push-buttons arranged on a rectangular region of the front face and mounted on the front face,
        a first storage device storing an image data, and
        a first communicator configured to transmit the image data to the mobile terminal; and
    wherein the mobile terminal comprises
        a second communicator configured to receive the image data from the image processing apparatus,
        a second storage device storing the image data received by the second communicator,
        a second display configured to display an image based on the image data stored in the second storage device, and
        a controller configured to control the second display to
            display, based on a standard first image data and a second image data transmitted from the image processing apparatus as the image data received by the second communicator, (i) a standard first image having a rectangular shape in which a plurality of objects are arranged in a first layout, and (ii) the second image when a first layout mode is selected, wherein the standard first image data represents the standard first image containing the plurality of objects respectively corresponding to a plurality of push-buttons, arranged in the first layout, which is generally the same as a layout of the plurality of push-buttons mounted on the front face of the image processing apparatus, and wherein the second image data represents the second image corresponding to an image being displayed on the first display; and
            display, based on a deformed first image data and the second image data as the image data received by the second communicator, (i) a deformed first image having a shape that is different from the rectangular shape in which the plurality of objects are arranged in a second layout and (ii) the second image when a second layout mode is selected, wherein the deformed first image data represents the deformed first image containing the plurality of objects arranged in the second layout that is different from the first layout.

2. The communication system according to claim 1, wherein the second layout mode includes a first-image priority mode and a second-image priority mode, wherein, when one of the first-image priority mode and the second-image priority mode is selected, the deformed first image having the shape that is different from the rectangular shape in which the plurality of objects are arranged in the second layout and the second image are displayed on the second display, and wherein the controller is configured to determine a size of the deformed first image to a first size and determine a size of the second image to a maximum size in which the second image is displayable on a display area on the second display, which remains after the deformed first image of the first size is arranged, when the first-image priority mode is selected, and determine the size of the deformed first image to a second size that is less than the first size and determine the size of the second image to a maximum size in which the second image is displayable on a display area on the second display, which remains after the deformed first image of the second size is arranged, when the second-image priority mode is selected.

3. The communication system according to claim 2, wherein, when a layout priority mode is selected, the standard first image having the rectangular shape in which the plurality of objects are arranged in the first layout and the second image are displayed on the second display, wherein an area on which the second image is displayable is greater in size when the plurality of objects of the deformed first image are arranged in the second layout than when the plurality of objects of the deformed first image are arranged in the first layout, and wherein the controller is configured to determine a size of the deformed first image to the first size and determine the size of the second image to a maximum size in which the second image is displayable on a display area on the second display, which remains after the deformed first image of the first size is arranged, when the first-image priority mode is selected, determine the size of the deformed first image to the second size and determine the size of the second image to a maximum size in which the second image is displayable on the display area of the second display, which remains after the deformed first image of a second size is arranged, when the second-image priority mode is selected, and determine a size of the standard first image to the second size and determine the size of the second image to a maximum size in which the second image is displayable on a display area on the second display which remains after the standard first image of the second size is arranged, when the layout priority mode is selected.

4. The communication system according to claim 2, wherein the mobile terminal further comprises:

a housing comprising a surface provided with the second display formed in a generally rectangular shape; and an orientation sensor configured to sense an orientation of the housing, wherein, when the orientation sensor has sensed that the orientation of the housing is changed from an orientation in which one of a lengthwise direction of the housing and a widthwise direction of the second display coincides with a horizontal direction, to an orientation in which another of the lengthwise direction and the widthwise direction of the display coincides with the horizontal direction, the size of the first image and the size of the second image are determined.

5. The communication system according to claim 2, wherein the size of a first image and the second image are changed without changing horizontal to vertical ratios of the first image and the second image, the first image being one of the standard first image and the deformed first image.

6. The communication system according to claim 2, wherein the controller is configured to receive the second image data and selection effectiveness information from the image processing apparatus in a state in which the second image created based on the second image data is displayed on the second display, the selection effectiveness information indicating whether the selection of at least one of the plurality of objects contained in the first image is effective, the first image being one of the standard first image and the deformed first image, display on the second display the first image in a state in which a display manner of at least one object that is indicated as being effective by the selection effectiveness information differs from that of at least one object that is indicated as being ineffective by the selection effectiveness information, and transmit object identifying information specifying the at least one object indicated as being effective to the image processing apparatus when a tap operation, performed on the first image displayed on the second display at the at least one object indicated as being effective by the selection effectiveness, has been received.

7. The communication system according to claim 2, wherein the controller is configured to determine a size of an image contained in a display area of the second image, which is to be displayed on the second display, when display-area identifying information specifying the display area is received, when a flick operation in which an input object is slid at acceleration greater than threshold acceleration on the second image displayed on the second display is received, transmit through the second communicator, to the image processing apparatus, flick information containing a moving direction of the input object and the acceleration, and display on the second display an image contained in a display area of the second image to be displayed after the flick operation when the display-area identifying information specifying the display area to be displayed after the flick operation is received.

8. The communication system according to claim 7, wherein images contained in a display area moved sequentially on the second image are displayed on the second display in order, based on the moving direction and the acceleration contained in the flick information, before the second display displays the image contained in the display area of the second image to be displayed after the flick operation.

9. A non-transitory storage medium storing a plurality of instructions readable by a computer of a mobile terminal comprising a communicator configured to receive an image data from an image processing apparatus, and a display configured to display an image based on the image data received by the communicator, wherein the plurality of instructions, when executed by the computer of the mobile terminal, cause the display to:

display, based on a standard first image data and a second image data transmitted from the image processing apparatus as the image data received by the communicator, a standard first image having a rectangular shape in which a plurality of objects are arranged in a first layout and a second image when a first layout mode is selected, wherein the standard first image data represents the standard first image containing the plurality of objects respectively corresponding to a plurality of push-buttons, arranged in the first layout, which is generally the same as a layout of the plurality of push-buttons mounted on a front face of the image processing apparatus, and wherein the second image data represents the second image corresponding to an image being displayed on the first display; and display, based on a deformed first image data and the second image data transmitted from the image processing apparatus as the image data received by the communicator, a deformed first image having a shape that is different from the rectangular shape in which the plurality of objects are arranged in a second layout and the second image when a second layout mode is selected, wherein the deformed first image data represents the deformed first image containing the plurality of objects arranged in the second layout that is different from the first layout.

* * * * *